(12) United States Patent
Schuster (10) Patent No.: US 7,500,419 B2
(45) Date of Patent: Mar. 10, 2009

(54) CENTER DRIVE MACHINE AND CLAMPING DEVICE THEREFORE

(76) Inventor: Helmut Schuster, Menhoferstr. 37, Denklingen (DE) 86920

( * ) Notice: Subject to any disclaimer, the term of this patent is extended or adjusted under 35 U.S.C. 154(b) by 793 days.

(21) Appl. No.: 10/928,896

(22) Filed: Aug. 27, 2004

(65) Prior Publication Data

US 2005/0046125 A1    Mar. 3, 2005

(30) Foreign Application Priority Data

Aug. 29, 2003  (DE)  ............... 103 39 913
Apr. 5, 2004    (DE)  ............ 20 2004 005 569 U
Aug. 18, 2004  (EP)  .................. 04019576

(51) Int. Cl.
*B23B 3/00*    (2006.01)
*B23B 23/00*  (2006.01)

(52) U.S. Cl. .............................. 82/122; 82/150

(58) Field of Classification Search .................. 82/122, 82/150, 151, 148; 29/564; 279/133, 46.1
See application file for complete search history.

(56) References Cited

U.S. PATENT DOCUMENTS

| | | | | |
|---|---|---|---|---|
| 2,124,347 A | * | 7/1938 | Groene et al. | .................. 82/19 |
| 2,192,436 A | * | 3/1940 | Groene et al. | .................. 29/36 |
| 5,213,348 A | * | 5/1993 | Crossman et al. | ........... 279/126 |
| 5,628,236 A | * | 5/1997 | Liao | ............................. 82/133 |
| 5,732,608 A | * | 3/1998 | Francois | ...................... 82/150 |
| 5,916,344 A | * | 6/1999 | Cucchi | ......................... 82/127 |
| 6,585,573 B2 | * | 7/2003 | Hochuli et al. | ............... 451/243 |
| 6,625,894 B1 | * | 9/2003 | Kovach et al. | ................. 33/201 |

FOREIGN PATENT DOCUMENTS

| | | |
|---|---|---|
| DE | 3247586 | 7/1987 |
| DE | 3620231 | 11/1987 |
| DE | 3636421 | 5/1988 |
| DE | 3826985 | 1/1990 |
| DE | 4105688 | 11/1993 |
| EP | 0499807 | 8/1992 |
| EP | 1034881 | 9/2000 |
| GB | 237009 | 7/1925 |
| GB | 2151166 | 7/1985 |

* cited by examiner

*Primary Examiner*—Willmon Fridie
(74) *Attorney, Agent, or Firm*—Schneck & Schneck; Thomas Schneck (57) ABSTRACT

The invention relates to a clamping chuck head for clamping a workpiece to be processed. The clamping chuck head comprises a rotatably supported clamping chuck having a first set of clamping segments for clamping a workpiece on a first perimeter area, an operating device for operating the first set of clamping segments, wherein the operating device comprises at least one spring element which closes the first set of segments for clamping the workpiece due to its bias; and a main sleeve in which the first set of segments is arranged, wherein the main sleeve is rotatably supported in the clamping chuck head on two bearings axially spaced from each other and the operating device is essentially arranged in an axial direction between the two bearings or in the area of the bearings.

12 Claims, 12 Drawing Sheets

CENTER DRIVE MACHINE AND CLAMPING DEVICE THEREFORE

TECHNICAL FIELD

The invention relates to a center drive machine and a clamping device for a center drive machine.

BACKGROUND ART

DE 32 47 586 C2 describes a horizontal lathe for both-end-processing by means of an open and driven clamping head. The clamping head is supported on the outer perimeter by means of a journal bearing and an axial bearing and a rotary gear rim is laterally arranged next to the bearings for driving by means of a belt. On the horizontal lathe each of both ends of a clamped workpiece is associated to one tool unit for processing the ends. For loading and unloading the blank and the readily processed workpiece a loading and unloading device can be activated. The clamping of the workpiece is carried out by inclined disk lamellas being bent by clamps. The bending of the lamellas is carried out by screw thread sleeves comprising disk lamellas, which are twistable by axially displaceable operating devices. The operating devices have to be axially displaced as separate elements.

DE 38 26 985 C1 and DE 36 20 231 C1 disclose each a horizontal lathe including a center drive for both end processing of a workpiece. The workpiece is rotatably supported in two clamps, wherein at least one of the clamps is driven. Short workpieces can not be processed on both ends with adjacent clamps.

The clamping chuck head of DE 41 05 688 C2 is provided to be mounted in a rotatably driven housing. Within the clamping chuck head a double set of clamping segments is provided, which can be operated by an operating device. The clamping of a workpiece is carried out by biasing two disk (Belleville) springs after the operating device has been released. By operating the operating device the disk springs are compressed and by compressing two slideable clampings release the clamping jaw segments so that the workpiece can be removed. For operating the operating device a plate including bolts is arranged outside the clamping chuck head, wherein the bolts act on the operating devices and the plate itself is tilted by a hydraulic device arranged outside the clamping chuck head.

The clamping chuck head of GB 21 51 166 is rotatably mounted and enables processing of a workpiece on both ends. Also here a double set of clamping segments is operated by means of an operating device to be externally applied, wherein the clamping segments of both sets are connected to each other and axially displaced while operating.

SUMMARY OF THE INVENTION

It is the object of the invention to provide a clamping chuck head for clamping a workpiece to be processed enabling a simple change of workpieces while having a low overall height.

It is a further object of the invention to provide a center drive machine for both-end-processing of a workpiece, which requires small base area.

It is further an object of the invention to provide an arrangement of vertical processing machines including flexible workpiece transportation.

BEST MODE FOR CARRYING OUT THE INVENTION

On a clamping chuck head according to claim 1 a main sleeve (main spindle) is rotatably supported on two bearings axially displaced to each other so that high radial stability of the clamping head is assured. Further, an operating device for operating at least one set of clamping segments of a clamping chuck is arranged between or essentially between the two bearings, i.e. at least the main elements of the operating device. The operating device is thereby installed over the axial overall height of the clamping head, thus axially arranged within the axial dimension limited by the bearings. For automatically opening (or closing) the clamping chuck it is therefore not necessary to provide elements of the operating mechanism in axial extension of the clamping chuck head or to position a separate operating means (axial direction) to the clamping chuck head for opening. The clamping chuck head according to the invention therefore enables an entire automation of a workpiece change at low axial overall height. Particularly, if only one set of clamping segments is provided, a both-end-processing of very short workpieces is enabled.

The clamping chuck can be supported freely rotatable or can be driven by means of a drive, for example by a motor driving the main sleeve (main spindle). Using the clamping chuck in the center drive machine described below it is driven by means of a drive unit.

Advantageously the clamping chuck for clamping a workpiece to be processed comprises two separated sets of clamping segments each clamping the perimeter of the workpiece on perimeter areas spaced from each other. By the clamping in two perimeter areas axially spaced from each other, the clamping chuck exerts a high leverage to a radial excursion during the processing of the workpiece, resulting in a high-precision processing under high radial powers acting on the workpiece. The two sets of clamping segments are jointly operated by means of the operating device for opening and/or for clamping the workpiece. The axial overall height is also minimal using a double set of clamping segments so that the processing of ends over a wide end range is accessible.

The at least one spring element acts advantageously between or essentially between the two sets of clamping segments, i.e. the spring power in the one direction acts almost completely on the first set of clamping segments and the spring power in the other direction (opposed power) acts almost completely on the second set of clamping segments. This allows an asynchronous closing and opening of clamping segments so that the workpiece can comprise a different diameter on the first perimeter area than on the second perimeter area (for example slightly conical workpiece).

Using a disk spring (Belleville spring) as a spring element very high spring powers at comparatively small axial overall length of the spring element are provided. Further, the disk spring (Belleville) allows a spring power constantly distributed over the perimeter, which acts on all clamping segments of a set so that a one-sided acting of the spring power and thus a canting while closing or opening the clamping segments is avoided. Both sets of clamping segments are advantageously arranged in a main sleeve, wherein the main sleeve is rotatably mounted on the clamping head and thus the clamping segments are aligned mechanically stable.

In an embodiment the spring element is arranged outside the main sleeve so that the sleeve diameter can be minimized, which altogether allows a clamping chuck head compactly constructed, which is preferably used for processing workpieces having short diameter. A carrier element of the operating device acts then on the clamping segments, wherein the at least one carrier element grips through the main sleeve. In contrast, if in another embodiment the at least one spring element is arranged within the main sleeve, no levers or carriers acting between the spring and the clamping segments are necessary. This arrangement, in which the sleeve diameter requires a greater diameter compared with the outer construction of the spring, is preferably employed for workpieces having greater diameters. If the spring element is positioned outside, an actuator of the operating device acts directly on the spring element or, if the spring element is positioned inside, the actuator acts on the spring element via at least one carrier gripping through the main sleeve.

The actuator is advantageously connected to a housing of the clamping chuck head or to a fixing position of the clamping chuck head, so that the actuator itself does not rotate and the power for clamping or extending the spring has not to be transmitted through a rotary connection. The rotationally fixed actuator acting on the spring element can advantageously comprise brake elements acting on the spring element or a connection element between the actuator and the spring element, so that after turning off the drive, the rotation of the main sleeve including the workpiece is slowed down by operating the actuator and the removal of the workpiece can be carried out faster. Alternatively or additionally to slowing down by means of the actuator also locking of the sleeve in a predetermined position can be carried out so that a predetermined relationship can be established in respect of the rotary position between the workpiece to be processed and the clamping chuck.

If an exchangeable set of clamping segments is provided on one side, preferably on both sides of the clamping chuck, various exchangeable sets of clamping segments can be used depending on the diameter of the workpiece having different ranges of clamping diameters. Thus a clamping chuck head can be cost-efficiently adapted to different ranges of diameters of the workpieces to be processed.

At least one side of the main sleeve is advantageously extendable by means of an axial expander and a new or previously removed set of clamping segments is employable in this expander so that also longer workpieces can be precisely processed by providing a greater axial lever by clamping on both perimeter surfaces. By exchanging few elements, the clamping chuck head can be cost-efficiently converted depending on the measurement of the workpiece and the processing requirements.

The center drive machine according to claim 10 comprises a machine frame and a center drive supported thereon. The center drive comprises a clamping device, for example a clamping chuck for clamping a workpiece to be processed, and the clamping device is rotatably and drivably mounted.

The center drive is formed as single head for freely clamping and driving the workpiece to be processed. No further separate clamping device is required to support the workpiece and the drive of the workpiece can exclusively be performed by the single head. By means of an operating device of the center drive the workpieces are automatically clamped and/or released so that the center drive machine can be used in an automated process. Thus no manual releasing or clamping of the workpiece is necessary. Also very short workpieces can be clamped rotatably processed at both ends, as the axial extension of the single head is short and no further support or drive point is required for the workpiece. The rotation axis of the center drive is vertically aligned so that the greatest dimension of the center drive machine extends in vertical direction and thus only a reduced base area is required at a production site. A contamination of the tools and units by residues (chips and coolants) is clearly reduced by the vertical alignment.

Movable arrangement or guidance are not necessary with a fixed arrangement of the center drive on the machine frame, allowing a high-precision processing of the workpiece due to the vibration blocking mount. In contrast, if the center drive is moveable in the rotation or the processing axis of the workpiece, the center drive can for example be moved over a workpiece positioned in rotation axis and gripped at one end by a handling device in order to clamp this preferably in center. Vice versa the center drive can be removed from the workpiece after releasing. It is thereby not necessary that during automatic feed the workpiece is moved in an axial direction into the center drive or is removed out of it, so that for example an axial displacement for a handling device (see below) can be economized. Otherwise, in respect of particularly long workpieces the feed and removal distance of the workpiece into and out of the center drive is divided between an axially moveable handling device and the moveable center drive, so that each displacement distances of both devices can be maintained short. Correspondingly, this applies to the processing tools or the supporting tools which due the moveability of the center drive have to be moved not at all or only at reduced distance.

For stabilization of the ends of a long workpiece against unbalance an arbor or a mandrel can be positioned to at least one of the ends or, in case of using a moveable center drive the end of the workpiece is moveable to the arbor or the mandrel. Advantageously, at least one arbor or one mandrel is movable and/or pivotable vertically or diagonally to the rotation axis from the rotation axis, so that particularly for removing a long workpiece, the removing distance and feeding distance for the workpiece to the center drive is not blocked.

If the center drive machine comprises two arbors, two mandrels or one mandrel and one arbor, the workpiece can be clamped and gripped at the end, while the center drive device releases the workpiece. By moving the moveable center drive or the two end-gripping devices the center drive can change the grip in respect of the workpiece, so that the workpiece is clamped at a shifted perimeter area and may be further processed at the perimeter surface in the previously clamped area. In principal, extensive processing of the workpiece's outer and inner surface is thus possible only by means of one center drive machine. Instead of the end-gripping device also a handling device for temporary gripping the workpiece during the action of changing the grip is usable.

The center drive machine advantageously comprises a tool unit which can be positioned to the first as well as to the second end of the clamped workpiece. Using the single head the traveling distance necessary for the tool unit to travel around the single head is short, so that solely one tool unit or one special tool unit can be cost-efficiently provided for both-end-processing. Independent of the tool unit processing both ends, additional tool units may be provided, each processing the upper or the lower end of the workpiece in a shared mode.

With one tool unit for example one end of a workpiece can be processed on the perimeter, on the front surface and/or within the workpiece.

At least one of the tool units advantageously comprises a rotatably supported turret for holding several tools. Further, one of the turrets can comprise a gripping device for gripping the workpiece. It is advantageous to arrange at least one of the tool units on a displacement unit moveable in direction of the rotation axis and vertically to the direction of the rotation axis.

In combination with the moveable center unit it is enabled that at least one tool unit can be fixed in the direction of the rotation axis and that it carries out only a movement vertically to the rotation axis, while the feed in direction of the rotation axis is performed by moving the center drive. Thus at one end a linear drive for the tool unit in direction of the axis can be economized. During processing the one end by use of the axially fixed tool unit another tool unit compensating the movement of the center drive and being axially moveable can process the other end of the workpiece.

The feeding and removing of the workpiece to and from the center drive is advantageously carried out by means of a handling device comprising a gripper. As mentioned above the handling device is moveable in direction of the rotation axis in order to remove the workpiece for example from the center drive fixedly mounted on the machine frame. In an embodiment, the handling device can be fixed in axial direction so that the moveable center drive is removed after gripping the workpiece by the handling device. In this case the handling device only has to perform a pivoting or rotating movement for feeding and removing the workpiece from and to the rotation axis, respectively. The handling device can advantageously be integrated in one of the tool units, for example a pivoted turret, so that a collective linear drive in direction of the rotation axis and/or a collective drive including a vertical component to the rotation axis is sufficient for both.

The processed workpiece is advantageously transported by means of a handling device to a further processing machine. There the handling device can transport the processed workpiece to a workpiece holder for being processed, or transfer it to a further handling device of the further processing machine, to a workpiece output and/or to a workpiece test station. Two handling devices are advantageously assigned to the center drive machine, wherein a first feeds the unprocessed workpiece and a second removes the processed workpiece.

The arrangement of adjacent vertical processing machines according to claim 18 comprises a handling device arranged between the processing machines for transferring a workpiece between the two processing machines. The handling device is arranged on a displacement unit moveable between the processing machines. The displacement unit is moveable in at least horizontal direction and enables to cover great distances between the processing areas of the processing machines. Deviations in distance between the processing machines due to installation are simply adaptable by adapting the drive way of the displacement unit. The handling device comprises advantageously a horizontally pivotable gripping arm. In a further embodiment also a rotation of the workpiece around the gripping arm axis is provided. For feeding the workpiece to the first processing machine and/or for removing the workpiece from the last processing machine an upstream and/or downstream handling device including a horizontal displacement unit is advantageously provided.

In another embodiment a workpiece can be fed to a first processing machine by a second handling device and/or a workpiece can be removed from the second processing machine by a third handling device. The second and/or third handling device(s) are/is advantageously arranged on an at least horizontally moveable displacement unit.

A clamping chuck head is described in more detail below comprising a fluid supply with which a fluid can be fed into at least one clamping chuck segment of a clamping chuck, where it can flow from an inner surface of the clamping chuck segment into an opening of a workpiece. Residues for example can thereby be rinsed in an opening of the workpiece.

FIGS. 1A-1D show side views of a vertical center drive machine 1. The concept described below as regards the center drive machine is of course also applicable for a horizontal center drive machine with a horizontal rotation axis of the workpiece 7, wherein however the base area need of the machine is increased.

The machine platform of the machine base body 2 of the center drive machine 1 of FIG. 1 vertically extends upward so that maintenance of tools from the front (from the right as shown in FIG. 1) is possible, even if several processing machines are laterally arranged in series. The machine base body 2 preferably comprises a mineral cast core optimally damping the vibrations of the processing site to the workhall and vice versa. A center drive unit 3 (center assembly) for free-end clamping of a workpiece 7 is arranged on a console 4. The console 4 in turn is arranged to be linearly moveable on a linear guidance 5. By means of a drive 6 the console 4 is vertically moved along the linear guidance 5 so that the vertical position of the center drive unit 3 can be modified. In an alternative embodiment not shown herein the center drive unit 3 is fixedly coupled to the machine base body 2 so that vibrations during a high-precision processing are further eliminated.

Figure 1A:
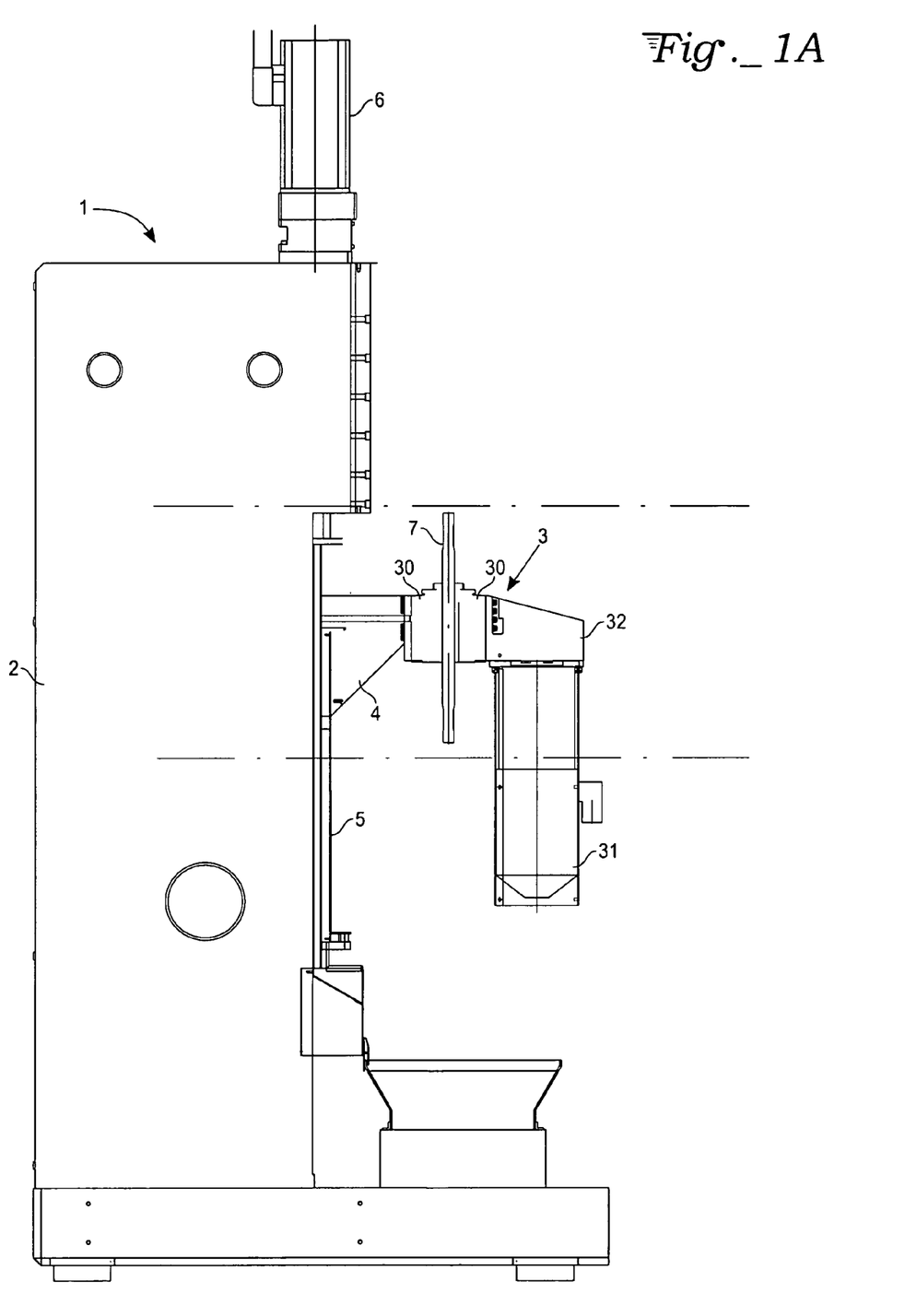
FIGS. 1A-1D are side views of a center drive machine shown schematically at different phases of an operating cycle.

The center drive unit 3 comprises a clamping head 30 for clamping the workpiece 7, a drive 31 for driving the workpiece 7 and an angle flange 32 connecting the drive 31 to the clamping head 30. In a further embodiment not shown herein the drive for the clamping head may also be arranged on the machine base body 2 and be connected to the clamping head 30 by a gearing mechanism (for example by means of a spindle).

Figure 1B:
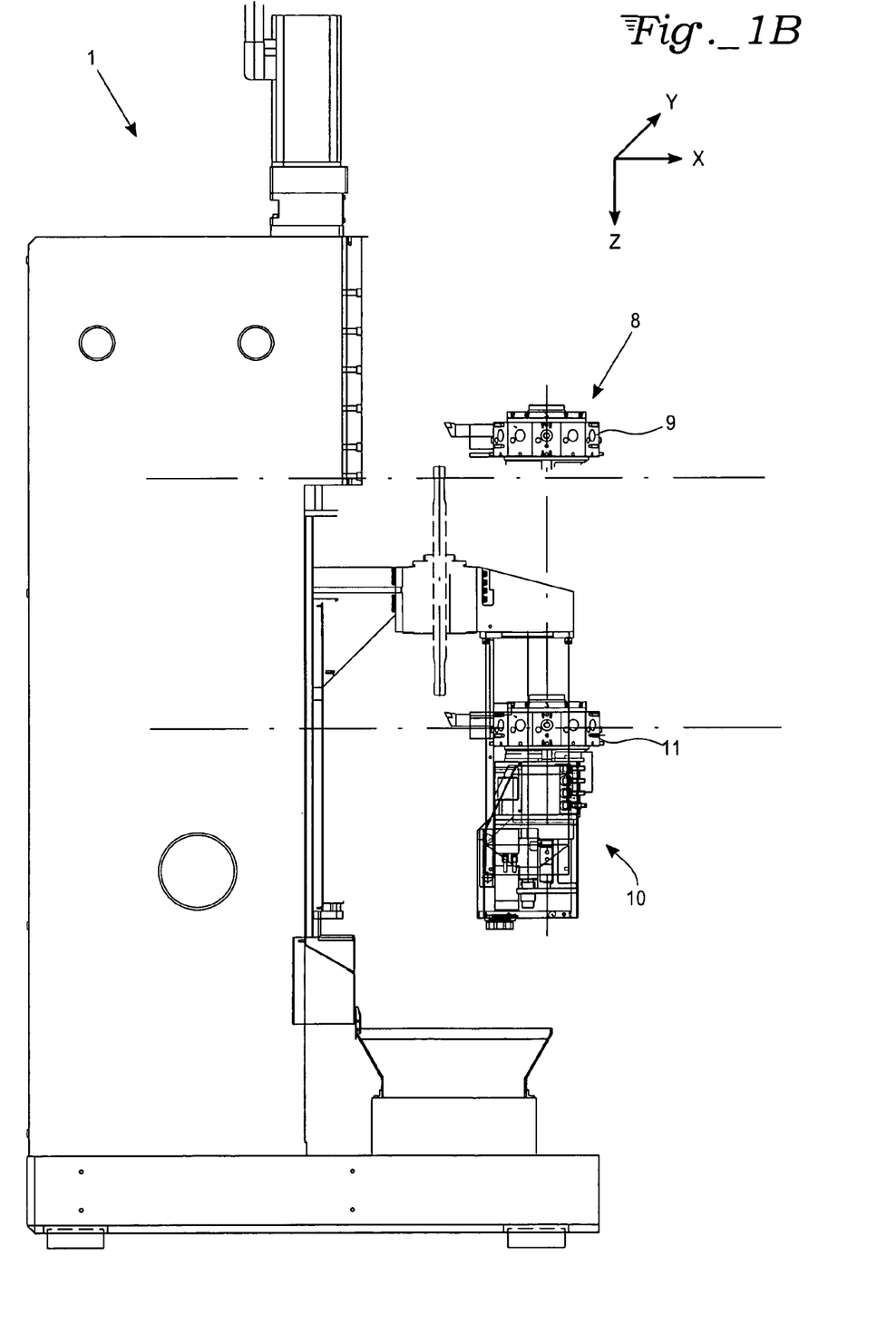

In FIG. 1B, a first tool unit 8 including a turret 9 and a second tool unit 10 including a turret 11 is schematically shown. The directional trihedron in FIG. 1B indicates the directions to which reference is made below. Therein the Z-direction is the vertical axis, the X-direction runs horizontally facing the center drive machine 1 (horizontally and in the drawing plane) and the Y-direction runs horizontally and in lateral direction to the center drive machine 1 (horizontally and perpendicularly to the drawing plane). The first tool unit 8 is laterally displaced in Y-direction behind the center plane of the center drive unit 3 and carries out a Y- and Z-movement by means of a displacement unit. The second tool unit 10 is forwardly displaced in Y-direction to the drawing plane (center plane of the center drive unit) and also carries out a Y-, Z-movement by means of a displacement unit. In an alternative embodiment the first or second tool unit 8, 10 can be set fixedly, wherein then the movement for axially processing the workpiece 7 is carried out by Z-displacement of the center drive unit relative to the first or second tool unit 8, 10.

In a further embodiment not shown herein, a tool unit for both-end-processing is provided. This single tool unit can also comprise a turret and be fixedly mounted or preferably moveable in Z-direction on the machine base body 2. The Z-movement is then carried out by either moving the moveable center drive unit 3 or the single tool unit. The relative traveling distance is thereby selected such that the upper as well as the lower end of the workpiece 7 can be processed by the single tool unit. As particularly in Y-direction the dimension of the center drive unit 3 is very low, the single tool unit is able to drive around the center drive unit 3 by slightly moving backwards in Y-direction so that either the center drive unit 3 drives past the single tool unit or the single tool unit drives past the center drive unit. A turret of the single tool unit thereby comprises in addition overhead tools enabling bottom-up processing, while the other tools are used for top-down processing.

The first and second tool unit 10, 11 as well as the single tool unit, as far as they are moveable in Z-direction, are arranged on a sliding carriage moveable on a not shown guidance in parallel to the guidance 5. The tool units and/or the single tool unit can thereby be arranged on a collective guidance arranged to the left or to the right of the guidance 5 or on two guidances arranged to the left and the right of the guidance 5.

Figure 1C:
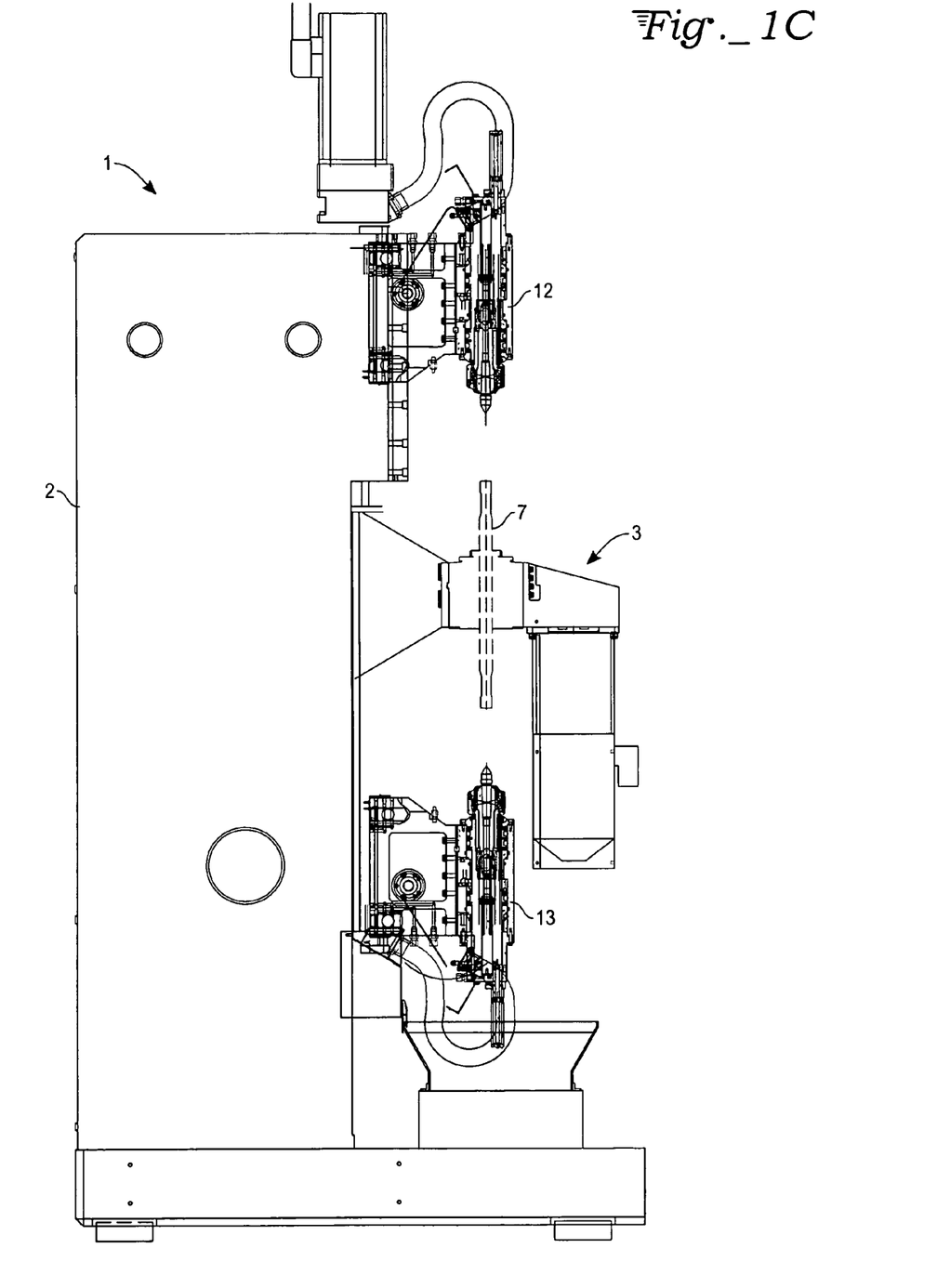

FIG. 1C shows a first and a second mandrel 12, 13 being arranged on the axis of the workpiece 7 and being preferably moveable in Z-direction. Advantageously the mandrels are arranged on the linear guidance 5 of the center drive unit 3. In a further embodiment not shown an arbor for supporting the end of the workpiece 7 may be provided instead of one or respectively two mandrels. Particularly while processing the perimeter of long workpieces the free ends of the workpiece are supported on one side or both sides by the mandrels 12, 13 so that unbalances can be avoided while processing. In a further embodiment the center drive unit 3 can also be fixed in Z-direction, wherein then both mandrels 12, 13 can be positioned in Z-direction. Alternatively, a mandrel 12 or 13 is fixed in Z-direction and the center drive unit 3 including the workpiece 7 is positioned to a fixed mandrel and the opposite mandrel being moveable is positioned to the other end of the workpiece.

Figure 1D:
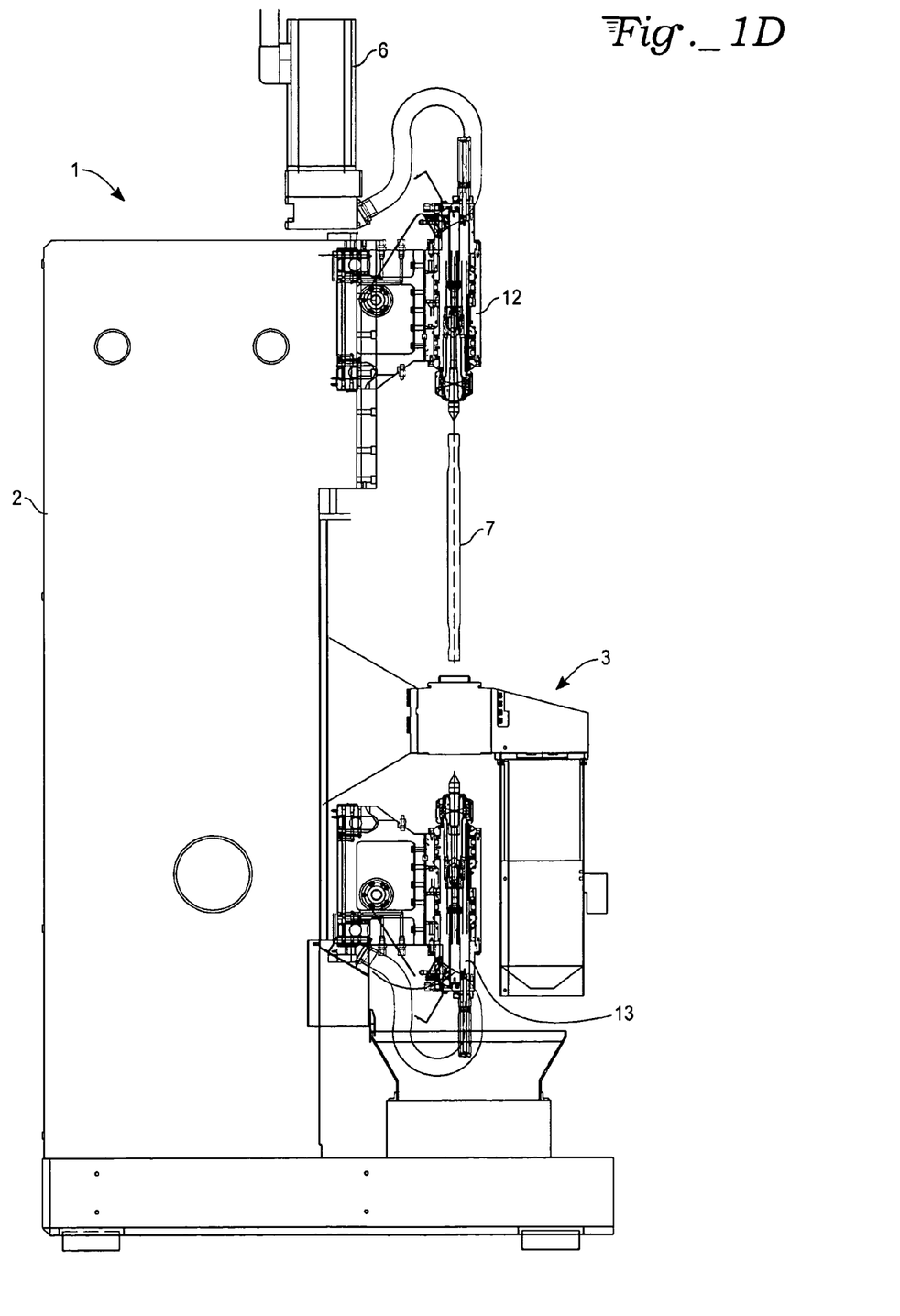

FIG. 1D shows the machine 1 in position where extremely long workpieces 7 can be moved out of the center drive unit 3 by lowering it. By a handling device (shown for example in FIG. 7 under reference numerals 80 and 85) in this case the workpiece 7 is gripped by a gripper so that after releasing the clamping head 30 and lowering the center drive unit the workpiece is free and solely held by the handling device. In the position shown in FIG. 1C the handling device can take the workpiece 7 out of the processing area by pivoting or moving backwards, or the handling device moves the workpiece 7 to the processing axis for loading.

Figure 2:
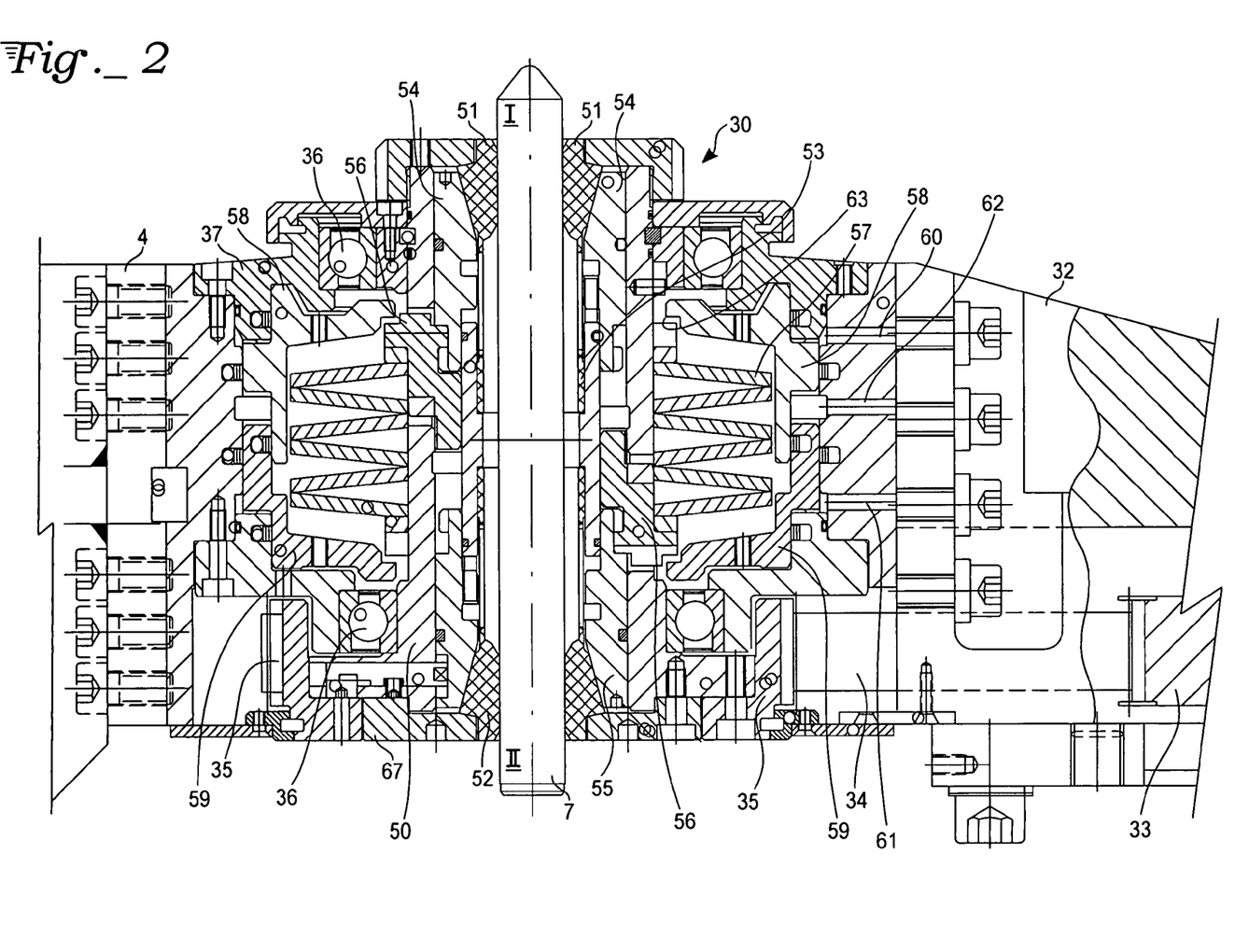
FIG. 2 is a cross-sectional view of a clamping head including a double clamping chuck.

FIG. 2 shows in cross-sectional view the clamping head 30. In the angle flange 32 a gear wheel 34 is rotatably mounted which is driven by a motor pinion 33 of the drive 31. The gear wheel 34 meshes with an outer rim gear 35 arranged on a rotatable spindle 50 (main sleeve). The spindle 50 is supported on a clamping chuck housing 37 by two ball bearings 36. Within the spindle 50 a first and a second clamping chuck 51, 52 are arranged, which clamp the workpiece 7 axially spaced on two perimeter areas I, II. The clamping chucks 51, 52 are formed sleeve-like as clamping chuck sleeve 53, wherein the lower part (in respect of the clamping chuck 51) is formed ring-shaped while the clamping segments in the upper area of the sleeve 53 are slit. The slit sleeve exerts a spring effect by the tongue-like center area of the clamping chuck sleeve, which radially opens the clamping segments while retracting the pressure sleeves 54, 55 operating the clamping segments.

The outer (partial) conical surface of each clamping chuck segment 51, 52 interacts with the inner conical surface of the first and second pressure sleeve 54, 55, respectively, wherein the pressure sleeves 54, 55 are axially displaced for opening and closing the segments. The pressure sleeves 54, 55 are slidingly arranged on the inner surface of the spindle 50 (main sleeve). The displacement of the first and second pressure sleeve 54 and 55 is carried out by segments 56 gripping through axial slots 40 in the spindle 50 (see FIG. 4). An upper set of segments 56 is assigned to the first pressure sleeve 54 and a lower set of segments 56 is assigned to the second sleeve 55.

A disk spring (Belleville spring) 57 on the outside of the spindle 50 is arranged which is clamped between the upper and the lower set of segments 56. By the bias the disk spring 51 pushes apart the upper set of segments 56 and the lower set of segments 56. A first piston element 58 acts on the upper set of segments 56 and a second piston element 59 acts on the lower set of segments. The piston elements 58, 59 are formed pot-like, wherein their upper rims are slideably mounted on each other. The piston elements 58, 59 are arranged axially slideable at the clamping chuck housing 37 and by moving the piston elements 58, 59 towards each other a supporting surface 63 on the inner area of the piston elements 58, 59 abuts on the segments 56, so that by further moving the piston elements 58, 59 towards each other the upper set of segments 56 in contrast to the lower set of segments are pushed together biasing the disk spring 57.

For operating the piston elements 58, 59 hydraulic oil is introduced through a first fluid inlet 60 and a second fluid inlet 61 into a hollow space between the piston elements 58, 59 and the clamping chuck housing 37, so that the first piston element 58 is displaced downwards and the second piston element 59 upwards (when seen in FIG. 2). During compression hydraulic oil is let out through a third fluid inlet 62. For moving the piston elements 58, 59 apart from each other the first and second fluid inlet 60, 61 are depressurized and hydraulic oil is pressed under pressure through the third fluid inlet 62, so that the two piston elements 58, 59 are moved apart from each other due to the pressure in the hollow space between the two piston elements 58, 59 and the clamping chuck housing 37. The arrangement shown in FIG. 2 also allows to grip a workpiece 7 having different diameters in the area of the first and second clamping chuck 51, 52 (perimeter areas I and II), as the displacement of the upper set of segments and the lower set of segments 56 allows a relative movement to each other, i.e. an asymmetrical displacement movement in respect of the spindle 50.

In another embodiment not shown herein, the third fluid inlet 62 can be omitted and the bias of the disk spring 57 is used for moving the piston elements 58, 59 apart from each other, wherein however no entire releasing results between the segments 56 and the supporting surface 63 of the piston elements 58, 59. In a further embodiment hydraulic oil is only introduced through the first or second fluid inlet 60, 61 and thus either the first or the second piston element is operated, so that only the first or second clamping chuck 51, 52 is opened. For example, if only a very short workpiece 7 is to be clamped by only one set of clamping jaws 51, 52. In a further embodiment, by one-sided fixing of the disk spring on a spindle 50, the operation of only a single clamping chuck 51 can be provided by only one piston element 58 or 59, wherein also in this case a decoupling of the guidance of the hydraulic oil from the pivoted parts is carried out.

Figure 3A:
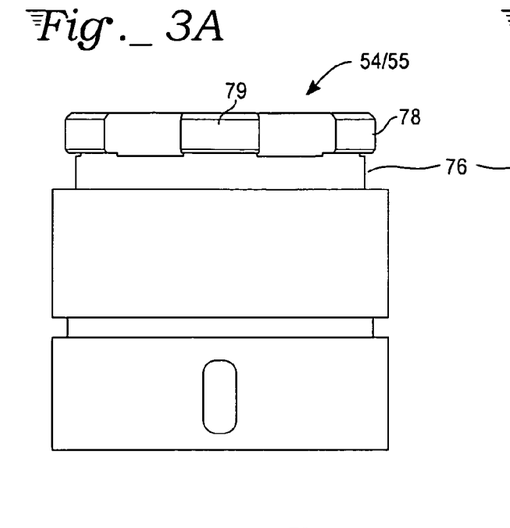
FIGS. 3A-3C are different views of a pressure sleeve of the clamping head shown in FIG. 2.
Figure 3B:
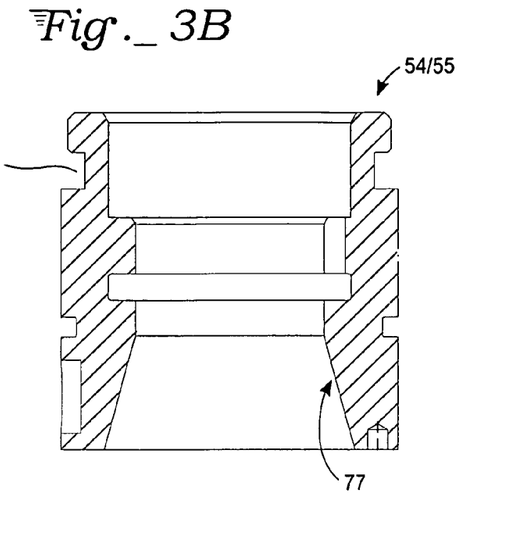
Figures 3C, 4, 5:
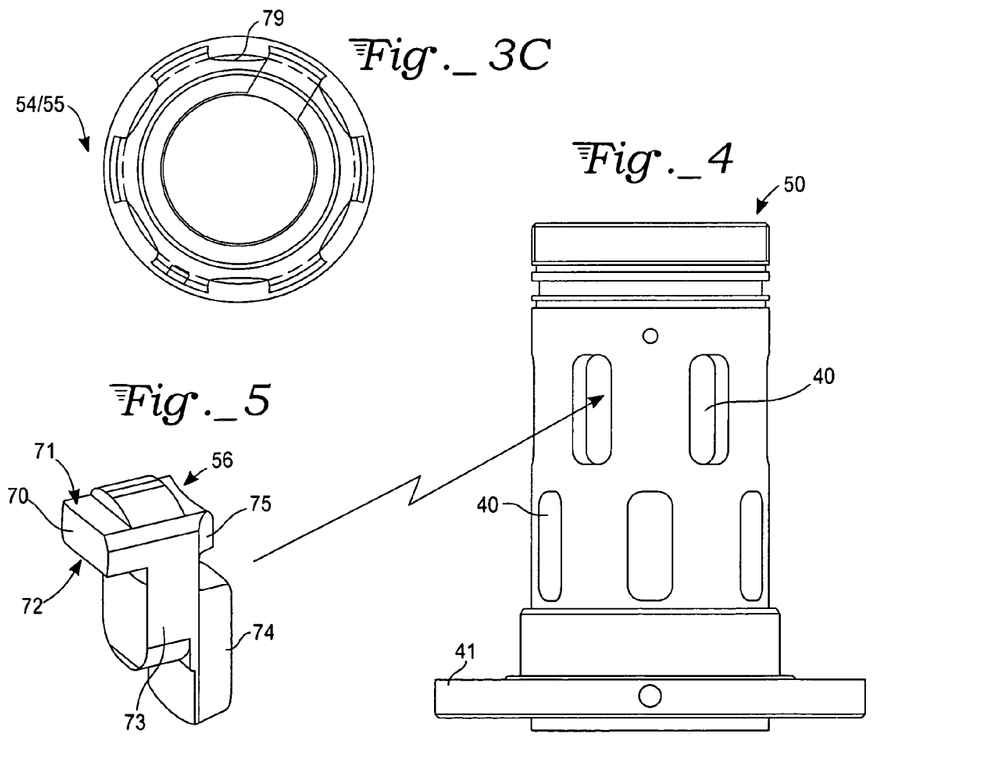
FIG. 4 shows a spindle of the clamping head shown in FIG. 2.
FIG. 5 is a displacement segment of the clamping head shown in FIG. 2.

FIGS. 3A-3C show a side view, a cross-sectional view and a top view (in respect of the depiction in FIG. 3A) of the pressure sleeves 54, 55. In the upper area of the pressure sleeve a surrounding groove 76 is formed. On the lower inner surface a cone 77 (conical surface) is formed which interacts with the conical backside of the chuck clamping segments 51, 52 as described above. The upper rim of the pressure sleeve 54, 55 is formed as a bayonet lock 78 having clearances 79.

FIG. 4 is a side view of the spindle 50, wherein on its inner perimeter area two rims having longitudinal slots 40 are formed. On the perimeter six segment slots 40 for the upper set of six segments 56 and six slots 40 for the lower set of segments are formed in the upper and the lower center area, respectively. The segments 56 are axially displaceable within the slots 40. On the lower end of the spindle 50 a flange 41 is provided, onto which the outer rim gear 35 is flanged.

FIG. 5 is a perspective view of one of the twelve segments 56 which is inserted in the segment slot 40 of FIG. 4 as indicated by the arrow. After the insertion the center body 73 is positioned within the segment slot 40 and an outer projection 70 protrudes beyond the outer surface of the spindle 50, while the inner guidance 74 and a projection 75 protrude on the inside of the spindle. After inserting the pressure sleeve 54, 55, the projection 75 engages with the groove 76 of the sleeves. After mounting the segments 56 and for inserting the pressure sleeves, the rim of the lock 78 is moved beyond the projections 75 at the clearances 79 while the pressure sleeves 54, 55 are axially inserted. By turning the pressure sleeves 54, 55 the projection 75 then engages with the groove 76 so that a coupling between segments 56 and pressure sleeve is ensured for an axial displacement. The first supporting surface 63 of the first and second piston elements 58, 59 act on a third supporting surface 71 at the outer projection 70 protruding from the outer diameter of the spindle 50, wherein the segments 56 of the upper set of segments are displaced downwards by the first piston element 58, while the segments 56 of the lower set of segments are displaced upwards by the second piston element 59. The disk spring abuts on the second supporting surface 72 of the outer projection 70 displacing the segments 56 of the upper set upwards and the segments of the lower set downwards.

Figure 6:
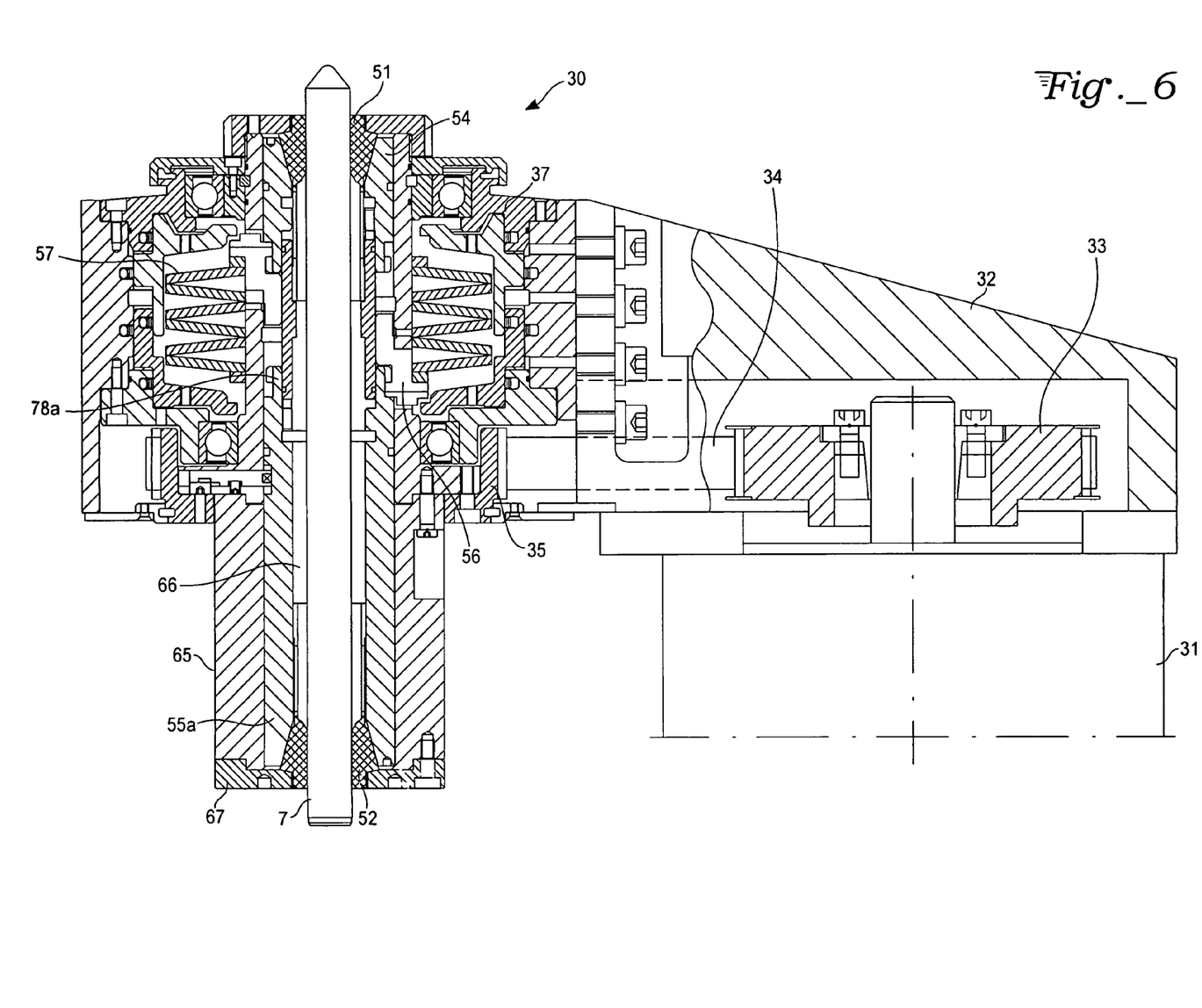
FIG. 6 shows the clamping head shown in FIG. 2, including an axial extension mount.

FIG. 6 shows a cross-sectional view of the clamping head 30 of FIG. 2 having an extension construction added on the lower end. In contrast to FIG. 2 the lower cover 67 of the flange 41 of the spindle 50 is unscrewed and instead of the lower cover 67 an extension sleeve 65 is seated on the flange 41. Instead of the short second pressure sleeve 55 a long pressure sleeve 55a is inserted, which extends to the end area of the extension sleeve 65. The lower second clamping chuck 52 is removed from the spindle 50 and inserted in the extension sleeve 65. The axial position of the second clamping chuck 52 is set by a supporting shaft 66 connected to the spindle 50 and by screwing the lower cover 67 onto the bottom of the extension sleeve 65. The long pressure sleeve 55a also engages with the lower set of segments 56 by means of a bayonet lock 78a (corresponding to 78 in FIG. 3A). The clamping head 30 is also extendable on the upper end by displacing the clamping chuck 51 upwards by means of a corresponding extension sleeve and an extended pressure sleeve.

Figure 7:
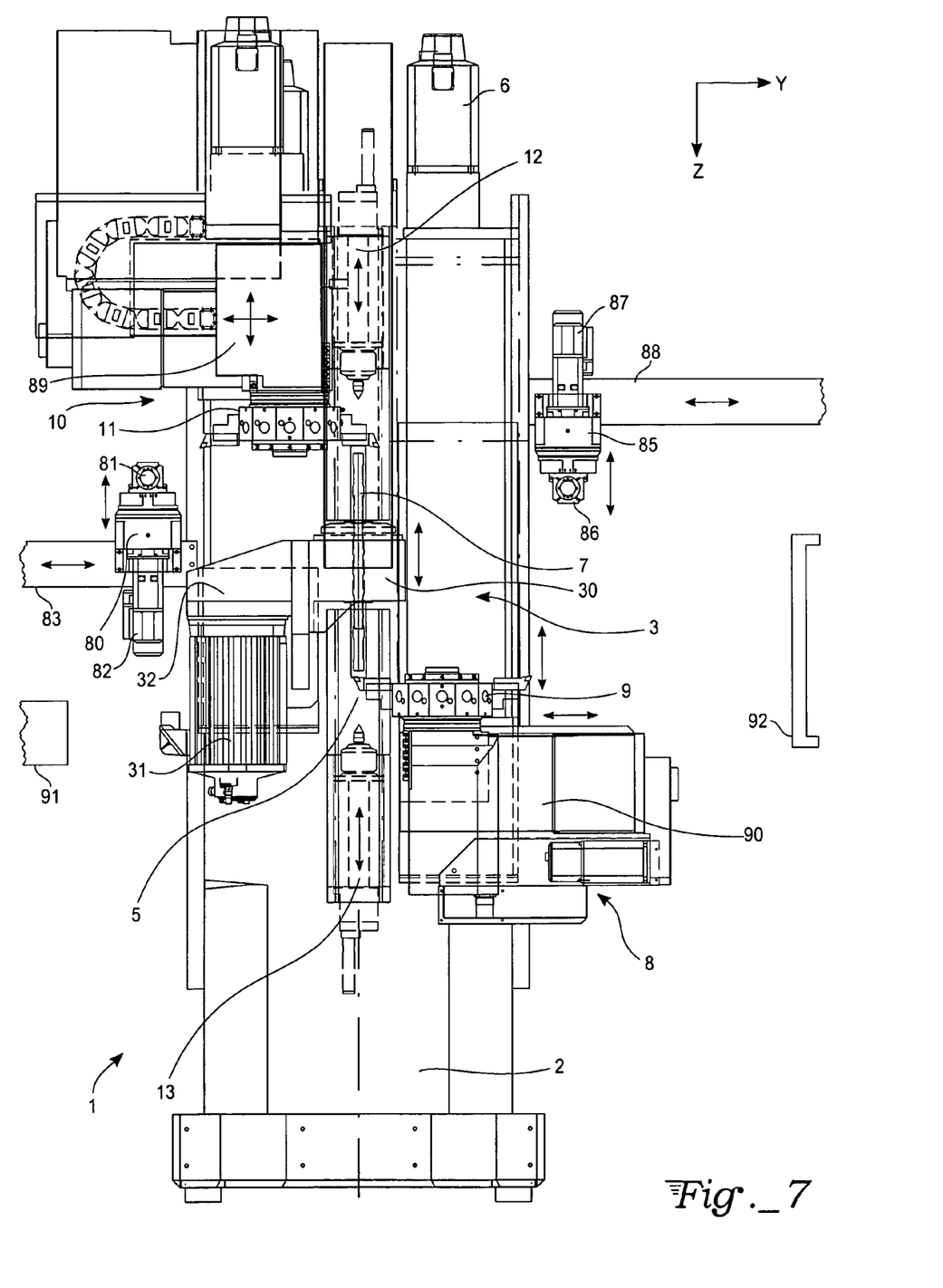
FIG. 7 is a front view of the center drive machine shown in FIG. 1.

FIG. 7 shows a front view of the vertical center drive machine 1. In addition to FIGS. 1A-1D the above mentioned first and second handling devices 80, 85 are shown. The first handling device 80 is displaced in Y-direction to the left of the processing zone of the center drive unit 3, while the second handling device 85 is displaced right-handed thereto. Both handling devices 80, 85 are provided with a gripping arm 81, 86 extending perpendicularly to the drawing plane of FIG. 7. The gripping arms are shown in the top view of FIG. 8. At the end of each of the two gripping arms 81, 86 a gripping device is arranged, which optionally enables also a rotation around the gripping arm axis in addition to the pivoting movement of the gripping arm around the Z-axis. Opposite to each gripping arm bearing a drive 82, 87 is provided for the pivoting movement of the gripping arm and the optional rotation of the gripping device. Each handling device 80, 85 is arranged on one of the YZ-displacement units 83, 88 for moving the handling device 80, 85 in Z- and Y-direction (the coordinates are shown top right in the Figure). As already mentioned above, the first tool unit 8 and the second tool unit 10 are also arranged on a YZ-displacement unit 89 and 90, respectively. Thus the corresponding turret 9, 11 can be positioned at the workpiece in Z- and Y-direction for processing the ends.

The drives of the lower handling device 80 and the lower tool unit 8 are constructed downwards in respect of the corresponding grip and work space, while the drives of the upper handling device 85 and the upper tool unit 10 are constructed upwards in respect of the corresponding grip and work space. Thus the gripping and processing zones may be very close to each other and the necessary distances for passing paths are very short which enables very short cycle times, even if small workpieces are processed. In a preferred embodiment and as shown in FIG. 1 the drive 31 of the center drive unit 3 is displaced to the front relatively to the processing zone (out of the drawing plane of FIG. 7). The drive 31 however can alternatively be constructed to the side as shown in FIG. 7.

The first handling device 80 loads the clamping head 30 with workpieces 7 from a workpiece magazine 91. The second handling device 85 removes the workpiece 7 processed in center drive machine from the clamping head 30 and transports the workpiece 7 initially to a control station 92 in which control measurements of the workpiece are made.

Figure 8:
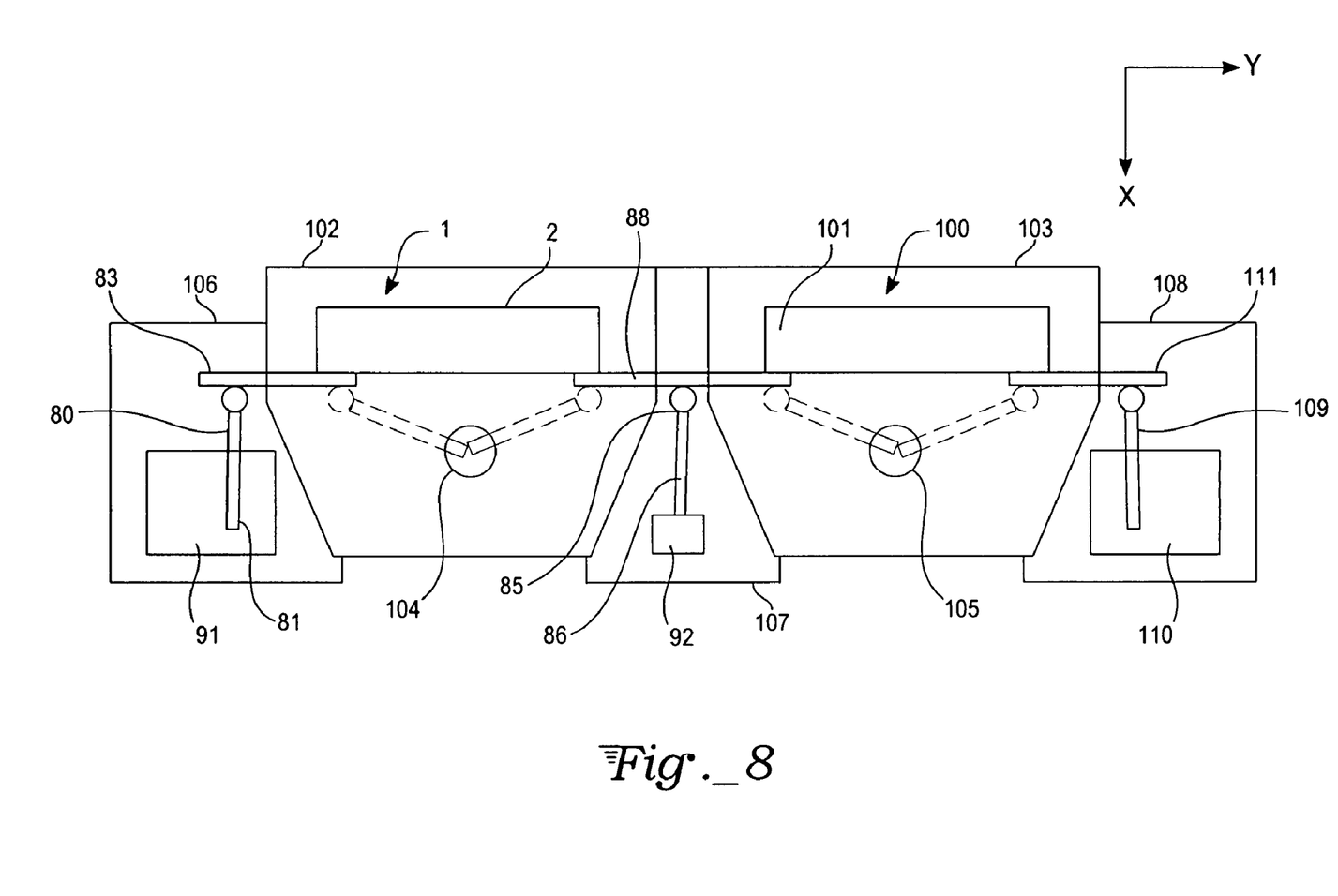
FIG. 8 is a top view of a processing line including the center drive machine.

FIG. 8 schematically shows the integration of the center drive machine 1 in a processing line. Loading the center drive machine 1 for processing the ends of the workpieces 7 is carried out by a loading cell 106 in which the workpiece magazine 91 is arranged. The first handling device 80 moves on the YZ-displacement unit 83 between the loading cell 106 and a first processing cell 102 shielding the center drive machine 1. The YZ-displacement unit 83 is arranged on the machine base body 2 of the center drive machine 1. After removing the workpiece from the workpiece magazine 91 it is transported by the first handling device 80 to the first processing zone 104 in the first processing cell 102. After processing the ends, the second handling device 85 removes the processed workpiece from the first processing zone 104 and transfers it from the first processing cell 102 to a control cell 107 using the YZ-displacement unit 88. In the control cell 107 control measurements of the processed workpiece 7 are optionally carried out at the control station 92. The workpiece is then transferred from the control cell 107 to a second processing cell 103 in which in this example a center processing machine 100 is shielded. The processing of the workpiece 7 is then carried out in a second processing zone 105 of the center processing machine 100 in the center portion where the workpiece had been previously clamped while processing it with the center drive machine 1. As shown, the YZ-displacement unit 88 of the second handling device 85 is fixed on the machine base body 2 of the center drive machine 1 as well as on a machine base body 101 of the center processing machine 100. The YZ-displacement unit 88 may also solely be fixed on machine base body 2 or 101.

A third handling device 109 removes the processed workpiece from the second processing zone 105 of the center processing machine 100 and transports it to an output cell 108. In the output cell 108 a workpiece magazine 110 is provided in which the processed workpieces are deposited. The third handling device 109 in turn is moveably arranged on a YZ-displacement unit.

The cells 106, 102, 107, 103 and 108 are separated from each other by partition walls. Locking devices open the partitions between cells 106, 102, 107, 103 and 108 respectively for the transit of the corresponding first, second or third handling device 80, 85, 109. While processing the workpieces in the processing zones 104 and 105 the handling devices 80, 85, 109 are removed from the processing cells 102, 103 and the locking devices separate the corresponding cells from each other so that the handling devices are not soiled by processing fluids and residues. For maintenance and repair work the cells 102, 107 are accessible by means of doors arranged at the front.

In a further embodiment not shown, one, two or all three handling devices 80, 85, 109 may be replaced in that instead of one of the tools a gripping device is arranged on the corresponding tool unit 8, 10 on the turret 9, 11. With the gripping device the workpiece 7 can be gripped and inserted or removed in or from the clamping head 30 or the clamping device of the center processing machine 100 by moving the correspondingly modified tool unit 8, 10 and/or the center drive unit 3 in Z-direction (correspondingly for the tool units of the machine 100 and its clamping device). For transporting the workpiece between the workpiece magazine 91 and the first processing zone 102, between the first processing zone 102 and the control station, between the first and the second processing zone and/or between the second processing zone 102 and the workpiece magazine the tool units equipped with gripping device(s) rest on YZ-displacement units 89, 90 etc. extended in Y-direction, in order to cover the transport paths between the workpiece magazine 91, the first processing zone 102, the second processing zone 104 and the workpiece magazine 110, respectively.

In a further embodiment, one or more handling devices 80, 85, 109 are not arranged on the separate YZ-displacement unit 83, 88, 111, but on the YZ-displacement units 89, 90 of the tool units 8, 10 (not shown for center processing machine 110). The Y-driving paths are correspondingly extended to carry out the tool transfer.

Figure 9:
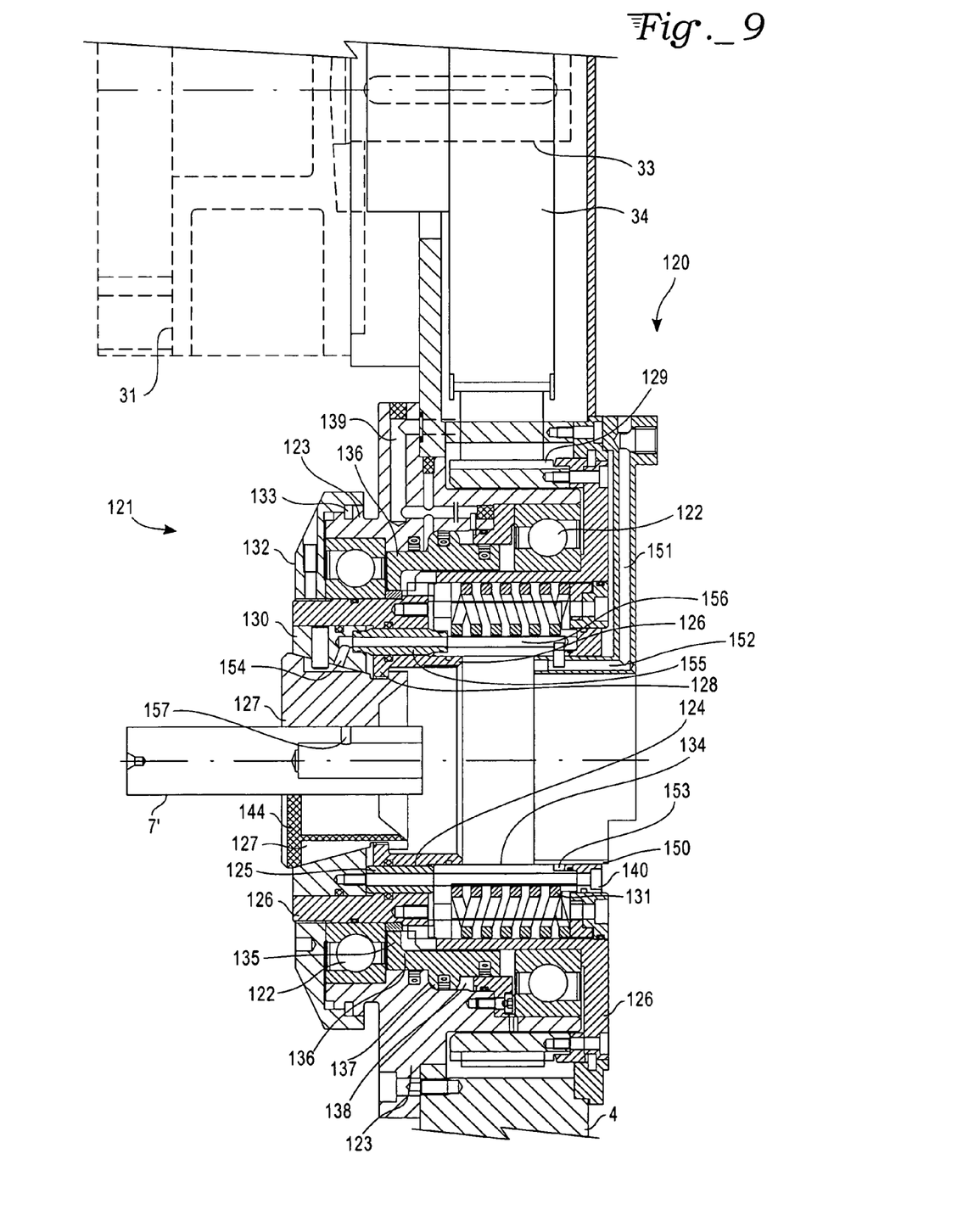
FIG. 9 is a cross-sectional view of a further embodiment of a clamping head comprising a single clamping chuck.

FIG. 9 shows a cross-sectional view of a further embodiment of a clamping chuck head 121 for the center drive unit 120 of a center drive machine, in which in contrast to the clamping chuck head 30 according to FIG. 2 only one clamping chuck is provided. As the center drive unit 3 the center drive unit 120 is mounted via a console 4 on a machine base body 2 (compare FIG. 1A to 1D). Diagonally facing the console 4 a drive 31 is arranged having a motor pinion 33 and a gear wheel 34. The gear wheel 34 grips in an outer rim gear 129 of the clamping head 121 rotatably supported on the ball bearings 122. For an optimal processing precision at high rotational speed two spindle bearings 122 are used having clamping planes inclined to each other. A motor housing of the drive 31 (motor) as well as the console 4 are connected to a clamping chuck housing 123 of the clamping head 121. The rotatable parts of the clamping head 121 are essentially arranged within a spindle 126 (main sleeve) rotatably supported on the ball bearings 122. The outer rim gear 129 is fixed to an angular (flange-like) extension of the main sleeve 126, so that by driving the outer rim gear 129 the main sleeve 126 is rotated.

Within the main sleeve 126 clamping chuck segments 127 of a clamping chuck are arranged. In the example as shown three segments 127 form the clamping gripper, wherein the segments 127 are connected to each other by an elastic intermediate layer 144, for example a rubber element. The intermediate layer 144 is compressed while clamping. When releasing the clamping gripper (see below) the intermediate layer 144 pushes the segments 127 apart from each other, so that the workpiece is released. On the outer surface of the clamping chuck segments 127 recesses are provided which are in engagement with an inwardly protruding annular projection 128 of the main sleeve 126, so that the segments 127 can not be displaced in axial direction during radial displacement for clamping and releasing a workpiece 7'. Further, the clamping chuck segments 127 comprise a partially conical outer perimeter interacting with a clamping sleeve 130 (pressure sleeve) which comprises a cone on the inner perimeter. The pressure sleeve 130 is axially slideable on the inner perimeter of the main sleeve 126. An axial displacement of the pressure sleeve 130 is transformed into a radial displacement of the segments 127 by the mating of the inner/outer surfaces of the main sleeve 130 and the segments 127.

Figure 10A:
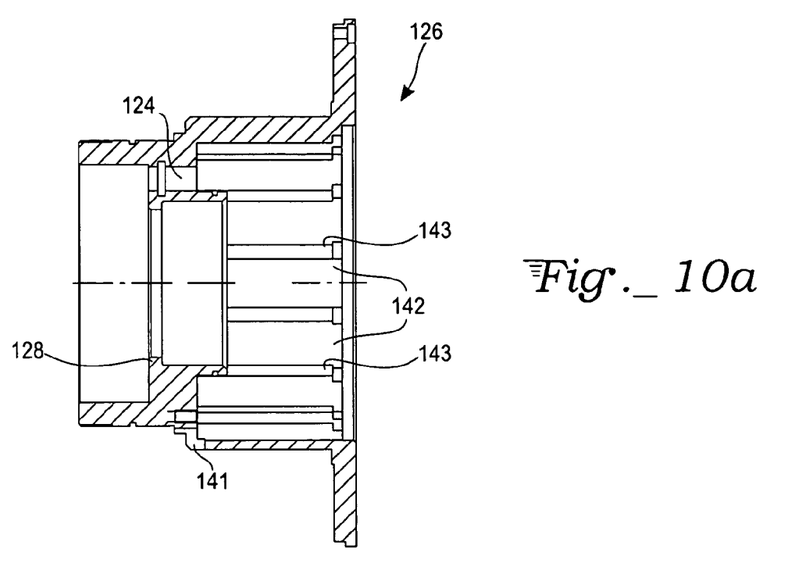
FIGS. 10A-10C show different views of a main spindle of the clamping chuck head shown in FIG. 9.
Figure 10B:
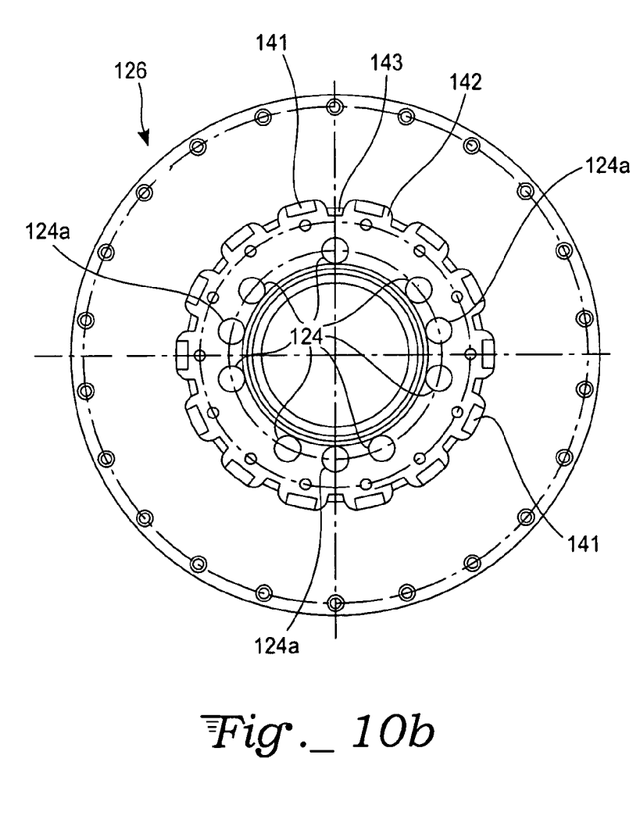
Figure 10C:
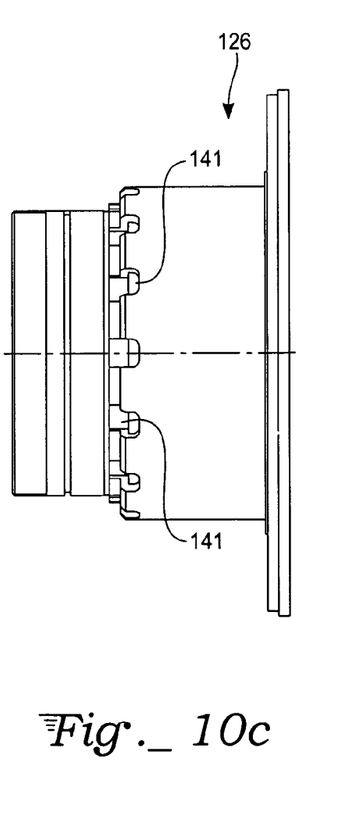
Figure 11A:
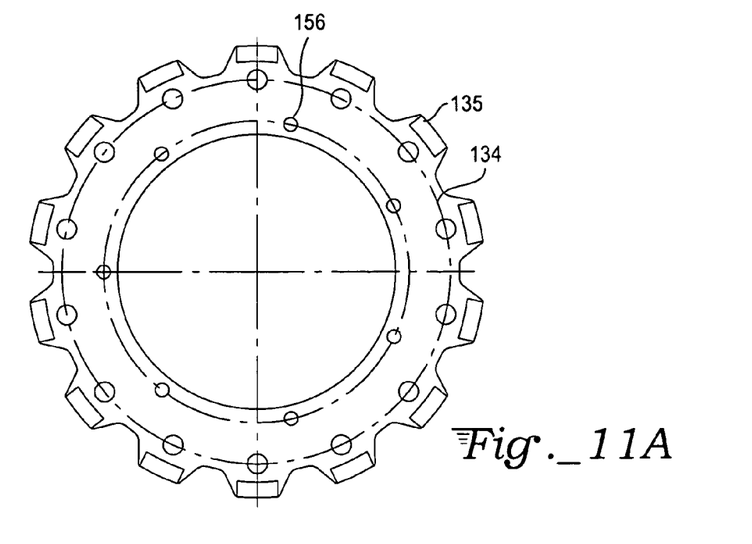
FIGS. 11A-11D show different views of an inner sleeve of the clamping chuck head shown in FIG. 9.
Figure 11B:
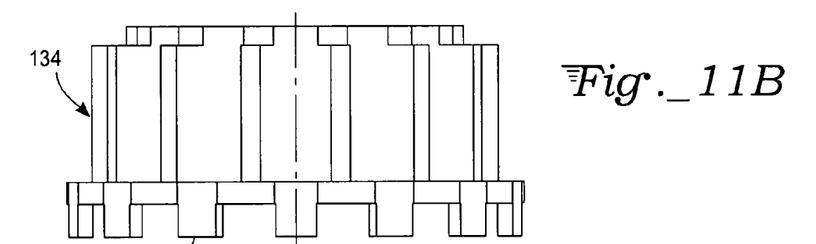
Figure 11C:
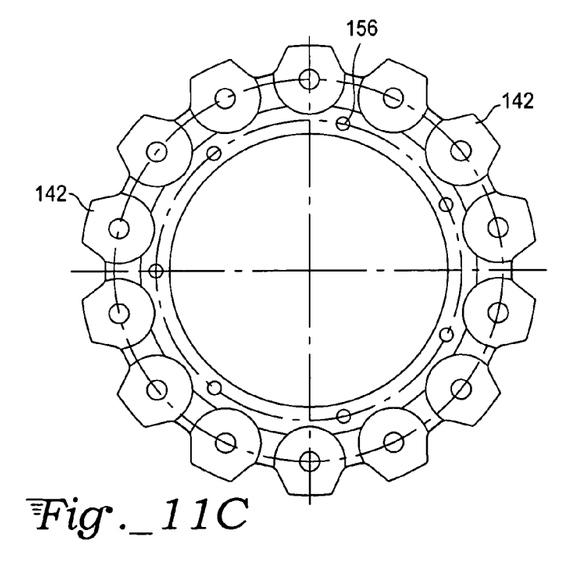
Figure 11D:
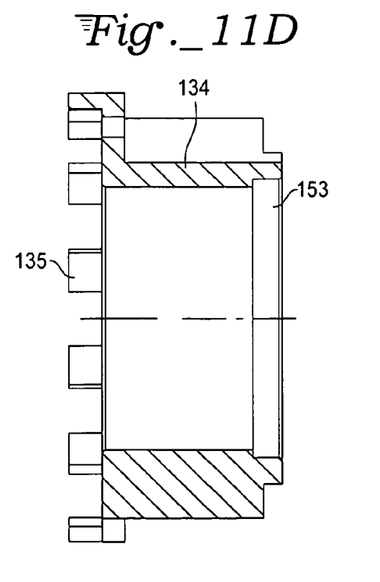

The main sleeve 126 comprises axially extending openings 124, seen in FIGS. 10A-10C, through which axially displaceable carrier pins 125 are running. The carrier pins 125 extending through the main sleeve 126 are each connected at one end (on the left in the drawing plane) to the pressure sleeve 130, while the other end of the carrier pins 125 (on the right in the drawing plane) are connected to an inner sleeve 134. The pressure sleeve 130, carrier pin 125 and inner sleeve 134 are fixed to each other by a screw 140 and are axially slideable as a unit within the clamping head 121.

Between the displaceable inner sleeve 134 and the main sleeve 126 helical springs 131 acting in axial direction are arranged, which displace the inner sleeve 134 in respect of the main sleeve 136 to the left due to their bias. Fourteen helical springs 131 are contained in spring chambers 142 (see FIGS. 10A-10C and 11A-11D), the side limits of which are formed by the inner surfaces of the main sleeve 126 (main spindle) at the supporting rips 143 and the outer surfaces of the inner sleeve 134. Depending on the desired clamping pressure provided by the clamping segments 127 onto the workpiece 7', the number of springs 131 may be selected without changing the remaining construction of the clamping chuck head 121. By means of the spring-operated displacement of the inner sleeve 134 the pressure sleeve 130 compresses the clamping segment 127 in radial direction, so that a workpiece 7' inserted in the opening of the clamping chuck is clamped.

On the outer perimeter of the inner sleeve 134 contact projections 135 extend in axial direction (to the left in the drawing plane), on which a cam of a piston element 136 acts. The contact projections 135 pass through recesses 141 in the main sleeve 126 (see FIG. 10). The piston element 136 is rotation-free supported in the clamping chuck housing 123 and is hydraulically operated by an axial movement relatively to the clamping chuck housing 123. To release a workpiece 7' clamped in a clamping head 121 hydraulic oil is pressed into a first chamber 137 between the piston element 136 and the housing 123 and thus the piston element 136 is axially displaced (to the right in FIG. 9). After a short displacement path the cam of the piston element 136 contacts the contact projections 135 and by further supply of hydraulic oil, the piston element 136 displaces the inner sleeve 134 to the right and thus releases the workpiece 7'. If a blank 7' to be processed is introduced between the clamping chuck segments 127, pressure from the first chamber 137 is relieved, while hydraulic oil is introduced under pressure in a second chamber 138 between the piston element 136 and the housing 123. Thus the piston element 136 actuates in axial direction (to the left in FIG. 9) and the inner sleeve 134 is displaced to the left by the bias of the helical springs 131, until no further displacement of the inner sleeve 134 is carried out due to the clamping of the workpiece 7'. Thereafter the piston element 136 is displaced until its end stop so that there is no contact between the rotationally fixed piston element 136 and the inner sleeve 134 while the main sleeve 126 is rotating. The supply of the hydraulic oil is supplied into the first chamber 137 by a fluid conduit 139 running through the housing 123 and having a connector for external supply of the hydraulic oil. The supply conduit for the second chamber 138 is arranged in a plane displaced to the conduit 139 and thus not shown.

As shown in FIG. 9, an annular cover plate 132 is mounted on the left end of the main sleeve 126, which extends over the left-sided bearing 122 and encompasses a front area of the clamping chuck housing 123. Between the cover plate 132 and the outer perimeter of the housing 123 a labyrinth seal 133 (gap seal) is arranged on the perimeter side. The cover plate 132 prevents an intrusion of procession residues into the bearing area of the center drive unit 120.

For cleaning and/or cooling the workpiece 7' and the clamping head 121 coolant or drilling fluid is fed up to the clamping chuck segments 127 via a medium sleeve 150 arranged on the right-hand inner surface of the clamping head 121. A support conduit 151 is fixedly connected to the housing 123 and comprises a fluid connection. The wall of the conduit 151 is formed as a connection between the housing 123 and the medium sleeve 150, so that the medium sleeve 150 rotatably fixed engages with the main sleeve 126. The medium sleeve 150 comprises an overlapping area with inner sleeve 134 and supplies fluid to an annular groove 153 formed in the inner sleeve 134 via an inner conduit 152. Due to the high rotational speed no slide seal but a gap seal is provided between the inner sleeve 134 and the medium sleeve, which causes low fluid loss in the transfer area. Within the inner sleeve 134 runs a bore 156 connected to the annular groove 152, extended by a conduit pin 155 and passing to the pressure sleeve 130. The pressure sleeve 130 comprises an outlet 154 through which the fluid is supplied to the clamping chuck segments 127. The conduit pins 155 are passed through openings 124a arranged on the same perimeter as the openings 124 for the carrier pins 125 (FIGS. 10A-10C).

In the workpiece 7' shown in FIG. 9, there is a radial bore 157 which is not allowed to be contaminated during the processing. Therefore, instead of or additionally to the coolant a fluid is introduced from the outlet 154 in the pressure sleeve 130 through radially running channels not shown in detail into the segments 127 up to their inner face. Then the fluid (e.g. lubricant) flows from the output of the inner wall of the segments 127 in the radial bores 157 (only one is shown) of the workpiece 7', and thus rinses them free during processing.

By means of a handling device (compare for example reference signs 80 and/or 85 in FIG. 8) having a 3-jaw chuck the workpiece 7' is fed from behind in the seat of the clamping segments 127 (from the right in FIG. 9) and/or is removed therefrom. The workpiece 7' is bored, hollowed out by turning and rumbled (right end) from behind, while a centering is introduced from the left in the left end of the workpiece. The processing of both sides in a clamp enables high-precision alignment for the further processing of the workpiece in a further processing machine, in which then the workpiece can be precisely processed on its outer surface in relation to the inner surfaces due to the centered clamping on both ends. For example the processing machine no. 1 in FIG. 8 is a center drive machine and processing machine no. 100 is a grinding machine with a clamp between a spindle and a sleeve.

What is claimed is:

1. A clamping chuck head for clamping a workpiece to be processed, said clamping chuck head comprising:
   a rotatably supported clamping chuck having a first set of clamping segments for clamping a workpiece at a first perimeter area;
   an operating device means for operating the first set of clamping segments, wherein the operating device has comprises at least one spring element means for closing the first set of clamping segments for clamping a workpiece due to its bias; and
   a main sleeve in which the first set of clamping segments is arranged, wherein the main sleeve is rotatably supported in the clamping chuck head on two bearings axially spaced from each other, the operating device being arranged in the axial direction in relation to and in proximity to the bearings.

2. The clamping chuck head according to claim 1 wherein the clamping chuck head further comprises a second set of segments arranged in the main sleeve for clamping the workpiece at a second perimeter area spaced in the axial direction relative to the first perimeter area.

3. The clamping chuck head according to claim 2 wherein both the first and second sets of clamping segments are arranged to respond to the operating device.

4. The clamping chuck head according to claim 2 wherein the at least one spring element closes both the first and second sets of clamping segments, thereby clamping a workpiece due to its spring element bias.

5. The clamping chuck head according to claim 2 wherein the operating device further comprises an actuator means acting on the at least one spring element for releasing the clamping segments.

6. The clamping chuck head according to claim 5 wherein the actuator means is slideably mounted and can be hydraulically operated within a rotatably fixed housing of the clamping chuck head.

7. The clamping chuck head according to claim 5 wherein the actuator means acts at least on one axially slideable clamping element and the clamping element acts on a set of clamping segments.

8. The clamping chuck head according to claim 7 wherein the clamping chuck has sides and at least at one side of the clamping chuck head allows a set of clamping segments to be removably mounted.

9. The clamping chuck head according to claim 8 wherein the main sleeve has an expander, wherein the removably mounted set of clamping segments is mounted in the expander.

10. A center drive machine for both-end-processing of a workpiece comprising:
    a machine frame;
    a center drive arranged on the machine frame, wherein the center drive comprises a driven clamping device for clamping and driving a workpiece to be processed; and
    an operating device means arranged within the clamping device for automatically clamping and releasing a workpiece;
    wherein the center drive is formed as a single head for freely clamping and driving a workpiece to be processed;
    wherein a rotation axis of the center drive is vertically aligned and
    wherein the center drive is moveably mounted in direction of the rotation axis.

11. A center drive machine for both-end-processing of a workpiece comprising:
    a machine frame;
    a center drive arranged on the machine frame, wherein the center drive comprises a driven clamping device for clamping and driving a workpiece to be processed; and
    an operating device means arranged within the clamping device for automatically clamping and releasing a workpiece;
    wherein the center drive is formed as a single head for freely clamping and driving a workpiece to be processed; and wherein a rotation axis of the center drive is vertically aligned and
    further comprising at least one handling device means for gripping a workpiece, for supplying the workpiece to the clamping device and for removing the workpiece from the clamping device.

12. The center drive machine according to claim 11 wherein said at least one handling device is moveable in direction of the rotation axis.

* * * * *